(12) United States Patent
Lenormand et al.

(10) Patent No.: US 9,013,359 B2
(45) Date of Patent: Apr. 21, 2015

(54) ON-BOARD DIRECTIONAL FLAT-PLATE ANTENNA, VEHICLE COMPRISING SUCH AN ANTENNA, AND SATELLITE TELECOMMUNICATION SYSTEM COMPRISING SUCH A VEHICLE

(75) Inventors: Régis Lenormand, Blagnac (FR); Xavier Denis, Colomiers (FR); Jacques Decroix, Odars (FR); Nicolas Chuberre, Pibrac (FR); Christian Rigal, Portet Sur Garonne (FR); Gilles Garnier, Plaisance Du Touch (FR); Jean-Luc Almeida, Le Fauga (FR)

(73) Assignee: Thales, Courbevoie (FR)

( * ) Notice: Subject to any disclaimer, the term of this patent is extended or adjusted under 35 U.S.C. 154(b) by 367 days.

(21) Appl. No.: 13/577,256

(22) PCT Filed: Jan. 27, 2011

(86) PCT No.: PCT/EP2011/051105
§ 371 (c)(1),
(2), (4) Date: Oct. 26, 2012

(87) PCT Pub. No.: WO2011/095425
PCT Pub. Date: Aug. 11, 2011

(65) Prior Publication Data
US 2013/0057431 A1 Mar. 7, 2013

(30) Foreign Application Priority Data
Feb. 5, 2010 (FR) ...................................... 10 00474

(51) Int. Cl.
*H01Q 21/24* (2006.01)
*H01Q 21/00* (2006.01)
(52) U.S. Cl.
CPC ........... *H01Q 21/24* (2013.01); *H01Q 21/0043* (2013.01); *H01Q 21/005* (2013.01)

(58) Field of Classification Search
CPC ....................................................... H01Q 21/005
USPC .......................................... 343/757, 762, 771
See application file for complete search history.

(56) References Cited

U.S. PATENT DOCUMENTS 4,691,205 A 9/1987 Profera, Jr.
6,166,701 A 12/2000 Park et al.
(Continued)

FOREIGN PATENT DOCUMENTS

FR 2448792 A2 9/1980

OTHER PUBLICATIONS

Wang J et al: "An embedded antenna for mobile DBS", 2004 IEEE 60th Vehicular Technology Conference. VTC2004-Fall (IEEE CAT. No.04CH37575) IEEE Piscataway, NJ, USA, vol. 6, Sep. 26, 2004, pp. 4092-4095, XP01079019.

*Primary Examiner* — Robert Karacsony
(74) *Attorney, Agent, or Firm* — Baker Hostetler LLP

(57) ABSTRACT

An onboard directional plane antenna comprises at least one array of radiating-slot waveguides comprising an alternating succession of three superposed metallic plates and of two dielectric substrates. The two substrates each comprise at least four adjacent waveguides, corresponding and communicating with one another pairwise by way of coupling slots. Each waveguide of the upper substrate furthermore comprises a plurality of radiating slots passing through the upper metallic plate, all the radiating slots of one and the same waveguide being parallel to one another and oriented in one and the same direction, the radiating slots of two adjacent waveguides being disposed in chevrons. Each waveguide of the lower substrate comprises an internal individual feed circuit comprising an individual electronic circuit for phase shifting and amplification.

8 Claims, 3 Drawing Sheets

(56) References Cited

U.S. PATENT DOCUMENTS

Figure 1A:
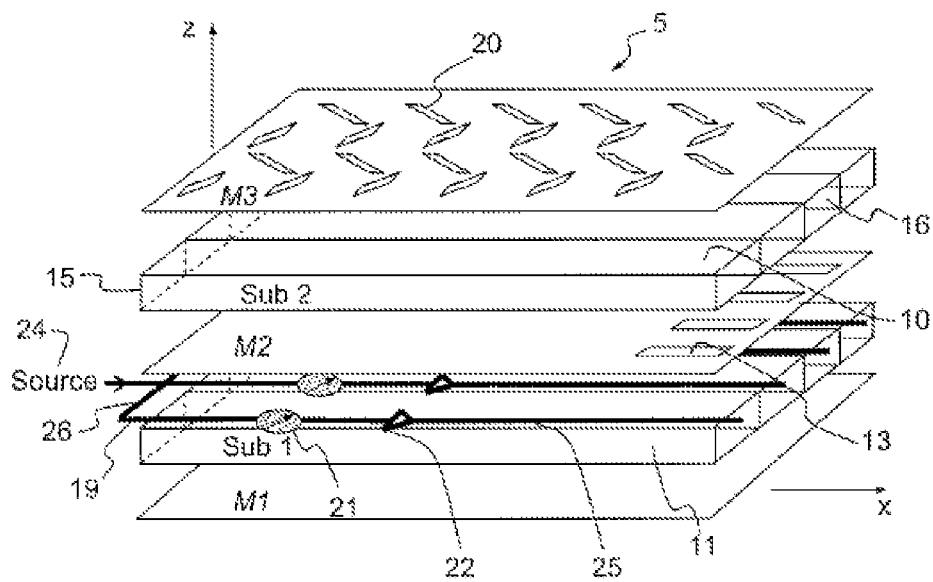

| | | |
|---|---|---|
| 6,351,244 B1 * | 2/2002 | Snygg et al. ............... 343/771 |
| 6,873,301 B1 * | 3/2005 | Lopez ........................ 343/770 |
| 2006/0132374 A1 | 6/2006 | Wang |
| 2011/0175780 A1 * | 7/2011 | Gatti et al. .................. 343/766 |

* cited by examiner

ON-BOARD DIRECTIONAL FLAT-PLATE ANTENNA, VEHICLE COMPRISING SUCH AN ANTENNA, AND SATELLITE TELECOMMUNICATION SYSTEM COMPRISING SUCH A VEHICLE

CROSS-REFERENCE TO RELATED APPLICATIONS

This application is a National Stage of International patent application PCT/EP2011/051105, filed on Jan. 27, 2011, which claims priority to foreign French patent application No. FR 1000474, filed on Feb. 5, 2010, the disclosures of which are incorporated by reference in their entirety.

FIELD OF THE INVENTION

The present invention relates to an onboard directional plane antenna, a vehicle comprising such an antenna and a satellite telecommunication system comprising such a vehicle. It applies notably to the field of satellite-based telecommunications and more particularly to telecommunication equipment installed on mobile vehicles such as terrestrial, maritime or aeronautical means of transport so as to ensure a bi-directional Ka-band connection between a mobile terminal and a terrestrial station by way of a repeater installed on a satellite. According to a particular embodiment, it also applies to the simultaneous tracking of two distinct satellites operating respectively in the Ka-band and in the L-band.

BACKGROUND

In transport means, such as trains, buses and airplanes, requirements in terms of connections to a broadband Internet service and requirements in terms of high-performance, low-cost and small-size antennas are growing. Currently, it is known to achieve a satellite link between a mobile terminal and a terrestrial station so as, for example, to ensure an Internet connection for passengers of a train or bus, by using a highly non-directional antenna operating in the L-band. The problem is that in the L-band there are very few frequencies available and that the transmission bitrate for the communications is therefore very low. To increase the bitrate, it is necessary to establish links with satellites operating in the Ku-band (10.5 GHz to 14.5 GHz) or the Ka-band (20 to 30 GHz) and to produce directional antennas. However, with a directional antenna, it is necessary to point the satellite continuously whatever the position of the vehicle. Moreover, in the Ku- or Ka-band, satellite-based transmissions may be masked by obstacles in the direction of pointing of a satellite. The obstacles may be vegetation or infrastructures such as buildings or bridges. It is therefore necessary, in order to increase the availability of the radiofrequency link with a satellite, to employ spatial diversity permitting the tracking of two satellites simultaneously. The two satellites having different directions of pointing, the simultaneous tracking of two satellites demands a dual-beam antenna with independent pointing, such as an electronic-scanning antenna, or two mechanical-pointing antennas.

In the case of an electronic-scanning antenna, to cover a territory such as Europe, the antenna must be able to ensure, in transmission and in reception, pointing in an angular domain lying between 0° and 360° in azimuth and between 20° and 60° on average in elevation.

These array antennas have the advantage of being plane and therefore of small size height-wise, however the angular domain to be covered being very large, in order to obtain good performance and avoid the appearance of array lobes in the antenna radiation pattern, it is necessary to use a beamforming array comprising a very large number of phase controls, this being prohibitive. For example, for an antenna in the Ku-band having an area of the order of 1 m², the number of radiating elements of the antenna must be greater than 15000, this being crippling in terms of antenna cost and complexity for an application to transport means.

In the case of the use of a double antenna with mechanical pointing, each antenna fashions a beam by using an independent mechanical pointing system to point at the two satellites simultaneously. In this type of antenna, the pointing of each antenna in the direction of a satellite is achieved through a combination of two mechanical motions. A first mechanical motion is obtained by way of a rotating platform disposed in a plane XY and ensuring the orientation of the antenna azimuthally. A second motion in elevation is achieved through an ancillary device, for example a plane mirror, tied to the platform. Each antenna conventionally comprises a parabolic reflector and a radiating source illuminating the reflector. To decrease the size of the reflector and reduce the height of the antenna, its periphery is elliptical instead of circular. Typically, a simple antenna such as this, deployed at present on high-speed trains, exhibits a height of the order of 45 cm. Although this height is compatible with present-day trains, it is too large for future high-speed trains with two decks for which the height available for the installation of an antenna, between the roof of the train and the catenaries, is much smaller.

Likewise, for an application in the aeronautical field, the height of the antenna has an influence on the drag produced by the airplane as well as on fuel consumption. For example, the present-day reflector-type antennas installed on airplanes have a height of the order of 30 cm and give rise to extra fuel consumption equivalent to eight additional passengers.

Architectures exist which make it possible to reduce the height of the mechanical-pointing antenna. According to a first architecture, the antenna is composed of two parallel plates between which there circulate longitudinal components of current and of a one-dimensional array of transverse continuous grooves which couple and radiate the energy into space. The two plates and the array of grooves are mounted on two coplanar platens rotating mechanically independently of one another, the two rotation motions being superposed and carried out in the same plane of the platens. The orientation of the lower platen makes it possible to adjust the direction of pointing azimuthally, and the orientation of the upper platen makes it possible to obtain a variable inclination of the grooves and to thus modify the direction of pointing in elevation of the beam produced by the antenna. However, this antenna operating initially under linear polarization, it is necessary to supplement it with an additional orientable polarization grid mounted on the upper face of the antenna so as to control the plane of polarization of the antenna, thereby increasing the complexity of implementation and the height of the antenna which is then not plane.

According to a second architecture of plane antenna with reduced height, the antenna comprises several alternating planes of substrates and of metallic planes superposed one above the other. The antenna comprises a first lower metallic plane, and then a first substrate plane comprising several sources, the first substrate plane comprising a lateral end forming a parabolic surface on which the waves emitted by the sources are reflected. On top of the first substrate plane is a second metallic plane comprising slots for coupling the reflected waveplane, each coupling slot emerging in respective slot waveguides disposed side by side parallel to one another in one and the same second substrate plane. The guided waves are thereafter emitted in the form of a beam radiated through a plurality of radiating apertures made in a third upper metallic plane. Scanning and squinting of the beam in elevation, in a plane perpendicular to the plane of the antenna, is obtained by switching the various sources, but no modification of pointing in azimuth is possible. Moreover, this type of very compact antenna exhibits the drawback of requiring high-power switching means, this never being simple to achieve. Furthermore, the switching of the sources is discrete, thus not making it possible to obtain continuous pointing of the beam. Finally, this very compact antenna is fed by a unique power source, thereby making it necessary to use bulky power amplifiers which considerably increase the bulkiness of the antenna which becomes too large for an application to transport means.

To solve the problem of discrete pointing of this plane antenna, it has been proposed to use just a single source and to place the plane antenna on a rotating platform making it possible to adjust the pointing azimuthally, the platform comprising a mirror articulated on the platform whose angle of inclination with respect to the plane of the platform is variable by rotation. The plane wave emitted by the source illuminates the mirror which reflects this wave along a chosen direction of pointing, the angle of inclination of the mirror making it possible to adjust the angle of elevation of the beam emitted. This antenna is highly elliptical, the dimension of the mirror in its region articulated on the platform being much greater than the dimension of the mirror in its region inclined above the platform, thereby making it possible to reduce the height of the antenna to 20 or 30 cm, but this height still remains too large for an application to transport means.

SUMMARY OF THE INVENTION

A first aim of the invention is to produce an onboard directional plane antenna not comprising the drawbacks of the existing antennas and that may be installed on a mobile transport means. In particular, the aim of the invention is to produce an onboard directional plane antenna, operating in the Ka-band, which is very compact height-wise, simple to implement and of low cost, and capable of remaining pointed at a satellite continuously whatever the position of the transport means and allowing control of the polarization plane without the addition of an orientable grid.

A second aim of the invention is to produce a very compact onboard hybrid plane antenna operating in the Ka-band and in the L-band, allowing simultaneous tracking of two satellites.

Accordingly, the invention relates to an onboard directional plane antenna comprising at least one array of radiating-slot waveguides, the array of radiating-slot waveguides comprising an alternating succession of three superposed metallic plates, respectively lower, intermediate and upper and of two dielectric substrates, respectively lower and upper, inserted between two consecutive metallic plates. The two substrates, lower and upper, each comprise at least four adjacent waveguides, the waveguides of the lower substrate and of the upper substrate being identical in number, corresponding pairwise and communicating with one another pairwise by way of coupling slots passing through the intermediate metallic plate. Each waveguide of the upper substrate furthermore comprises a plurality of radiating slots passing through the upper metallic plate, all the radiating slots of one and the same waveguide being parallel to one another and oriented in one and the same direction, the radiating slots of two adjacent waveguides being disposed in chevrons. Each waveguide of the lower substrate comprises an individual internal feed circuit comprising an internal individual electronic circuit for phase shifting and amplification.

Preferably, each chevron forms an angle equal to 90°.

Advantageously, the array of radiating-slot guides is mounted on an azimuthally rotating platform.

Preferably, the plane antenna furthermore comprises an external phase shifting electronic circuit intended to establish a circular polarization of a wave emitted by the array of radiating-slot guides, the external phase shifting electronic circuit comprising a first external phase shifter having a phase value equal to 180° and intended to feed two waveguides in phase opposition, the other two waveguides being fed in phase, and a second external phase shifter having a phase value equal to 90° and intended to establish a phase quadrature between the two waveguides fed in phase and the two waveguides fed in phase opposition.

Preferably, the plane antenna comprises two arrays of radiating-slot waveguides, of identical structure, dedicated respectively to transmission and to reception.

Advantageously, the plane antenna furthermore comprises a plurality of L-band radiating dipoles, the radiating dipoles being installed on one of the metallic plates of the arrays of radiating-slot waveguides mounted on the rotating platform.

The invention also relates to a vehicle comprising at least one such plane antenna and a satellite telecommunication system comprising at least one such vehicle.

BREIF DESCRIPTION OF THE DRAWING

Figure 1B:
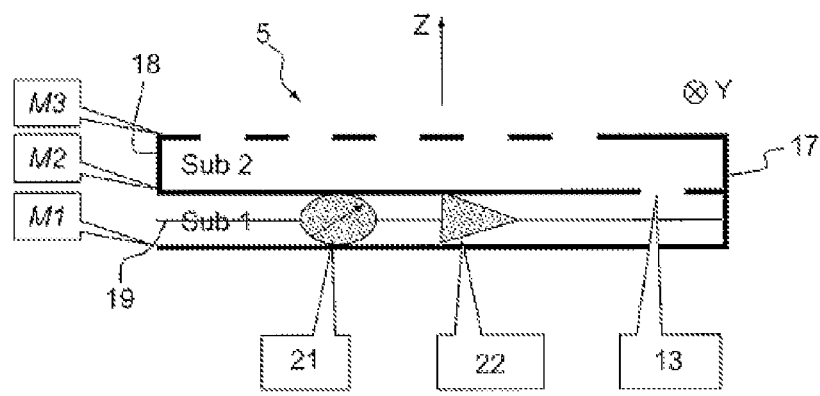
Figure 2:
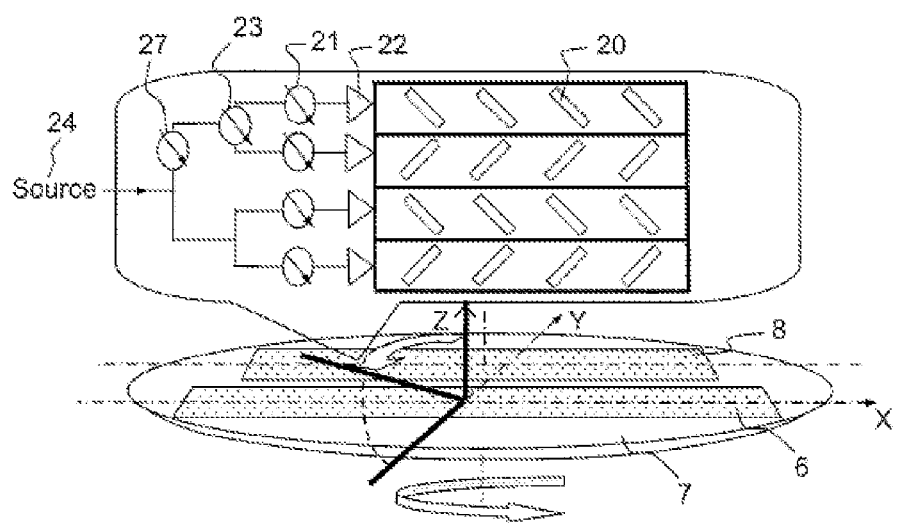
Figure 3:
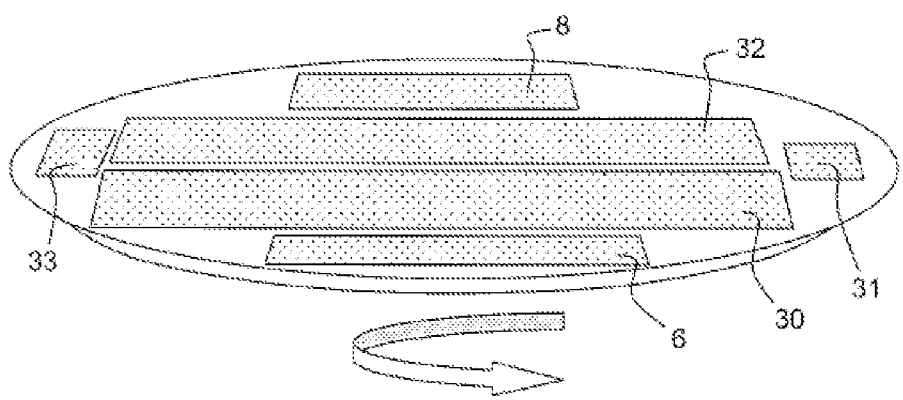
Figure 4:
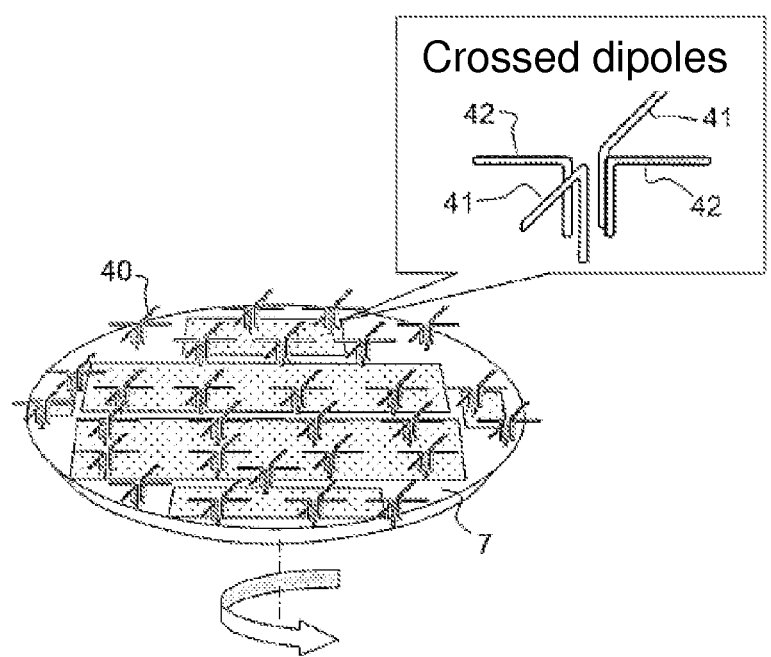

Other particular features and advantages of the invention will become clearly apparent in the subsequent description given by way of purely illustrative and nonlimiting example, with reference to the appended schematic drawings which represent:

FIGS. 1a and 1b: two partial diagrams, respectively in perspective and in section, of an exemplary internal structure of a plane antenna, according to the invention;

FIG. 2: a block diagram of the installation of an exemplary structure of a plane antenna with circular polarization, comprising separate transmit and receive functions, according to the invention;

FIG. 3: a diagram of the installation of an example of dual-band plane antennas, comprising separate transmit and receive functions and operating alternately in the Ka- or Ku-band, according to the invention;

FIG. 4: a diagram of the installation of an example of tri-band plane antennas, comprising separate transmit and receive functions and operating simultaneously in the L-band and in the Ka- or Ku-band, according to the invention.

DETAILED DESCRIPTION

The plane antenna represented partially in FIGS. 1a and 1b is of tri-plate structure. It comprises an array 5 of radiating-slot waveguides comprising an alternating succession of three metallic plates M1, M2, M3 respectively lower, intermediate and upper, superposed in parallel one above the other, and of two dielectric substrates Sub1, Sub2, respectively lower and upper, inserted between two consecutive metallic plates. The planes of the various layers of the antenna are parallel to a plane XY. The height of the antenna is along an axis Z orthogonal to the XY plane. The upper dielectric substrate Sub2 supports the radiating-slot waveguides 10, and the lower substrate Sub1 supports waveguides 11 intended to individually feed each radiating-slot waveguide 10 via a microwave signal. The antenna having to operate in the Ka-band, in order to comply with the standards imposed in this operating domain, it must emit waves under a circular polarization. Therefore, according to the invention, the array 5 comprises at least four radiating-slot waveguides devised in the upper substrate and four corresponding feed waveguides devised in the lower substrate. The radiating slot waveguides 10 of the upper substrate and the waveguides 11 of the lower substrate are identical in number, correspond pairwise and communicate with one another pairwise by way of coupling slots 13 passing through the intermediate metallic plate M2. Thus, in FIG. 1*a*, each waveguide 11 of the lower substrate Sub1 comprises two metallic walls, lower and upper, respectively formed by the lower M1 and intermediate M2 metallic plates and lateral metallic walls linking the two metallic plates, lower M1 and intermediate M2. Each waveguide 11 of the lower substrate Sub1 furthermore comprises a coupling slot 13 passing through the intermediate metallic plate M2 and emerging in a waveguide 10 of the upper substrate Sub2. Each waveguide 10 of the upper substrate Sub2 comprises two metallic walls, lower and upper, respectively formed by the intermediate M2 and upper M3 metallic plates and lateral metallic walls linking the two metallic plates, intermediate M2 and upper M3. The waveguides 10, 11 lie along a longitudinal axis parallel to one and the same direction, that may correspond, for example, to the X axis and comprise two opposite ends 15, 16 on this axis. As represented in FIG. 1*b*, the waveguides of the upper substrate Sub2 are closed at their two ends 15, 16 by a first and a second transverse metallic walls 17, 18 linking together the three metallic plates M1, M2, M3 whereas the waveguides of the lower substrate are closed only at a single end 16 by the first transverse wall 17, their open end 15 corresponding to a signal input 19. Each waveguide 10 of the upper substrate Sub2 furthermore comprises a plurality of radiating slots 20 passing through the upper metallic plate M3. All the radiating slots 20 devised in one and the same waveguide are parallel to one another and oriented in one and the same direction, for example at 45° with respect to the X and Y directions and emit a waveplane which is polarized parallel to their orientation. The radiating slots 20 of two adjacent waveguides 10 are disposed in chevrons, each chevron forming a nonzero angle, for example equal to 90°. In FIG. 1*a*, all the slots are oriented at 45° with respect to the X and Y directions but the radiating slots 20 of two adjacent waveguides are disposed in chevrons and form an angle of 90° between themselves.

Each waveguide 11 of the lower substrate Sub1 comprises an individual internal feed circuit 25 able to receive an incoming microwave signal 19 applied at its open end, this individual internal feed circuit 25 comprising an internal individual electronic phase shifting and amplification circuit comprising an internal phase shifter 21 for controlling the phase of the signal to be emitted and an internal amplification device 22 for amplifying the incoming signal making it possible to control the radiation emitted by the antenna. The incoming signal 19 may be emitted for example by an external source 24, for example single, and then divided by a divider 26 linked at the input of each of the waveguides 11 of the lower substrate Sub1. After phase shifting 21 and amplification 22, the incoming signal 19 entering one of the waveguides 11 of the lower substrate Sub1 is transmitted in a corresponding waveguide 10 of the upper substrate Sub2 by way of the coupling slots 13 in the intermediate metallic plate M2 and then radiated by the radiating slots 20. Scanning and squinting of the beam in elevation, in a plane ZX perpendicular to the plane XY of the antenna, is obtained by controlling the phase and amplitude law applied electronically by the individual internal feed circuits of each waveguide 11 of the lower substrate corresponding to each of the radiating-slot waveguides 10.

Each waveguide 11 of the lower substrate Sub1 being fed individually by an internal circuit 25 and comprising an internal individual electronic circuit for phase shifting 21 and amplification 22, the phase control is carried out in a continuous manner, thereby making it possible to continuously control the direction of radiation of the antenna in elevation. Moreover, the amplification is distributed among each waveguide 11 thereby making it possible to use low-power amplifiers and to dispense with a complex and bulky external amplification circuit. Furthermore, no high-energy source switching means is necessary in order to achieve continuous scanning of the beam.

In order that the wave emitted may have circular polarization, the array 5 of radiating-slot waveguides furthermore comprises a second external phase shifting electronic circuit placed at the input of the array 5, this second phase shifting circuit comprising a first external phase shifter 23 having a phase value equal to 180° and intended to feed the second radiating-slot waveguide in phase opposition with respect to the first radiating-slot waveguide and a second external phase shifter 27 having a phase value equal to 90° and intended to establish a phase quadrature between the signals feeding the first two waveguides 11 and the signals feeding the third and fourth waveguides 11.

Each radiating-slot waveguide having slots inclined at 45° with respect to the X and Y directions and forming an angle of 90° between themselves, the slots of each waveguide 10 radiate a waveplane comprising two components of polarization respectively in the X and Y directions. The first and second waveguides being fed in phase opposition, the waves that they emit combine together vectorially and globally radiate a resultant wave polarized in the X direction, the components of polarization in the Y direction cancelling one another out. The third and fourth waveguides being fed in phase, the waves that they emit combine together vectorially and globally radiate a resultant wave polarized in the Y direction, the components of polarization in the X direction cancelling one another out. The two resultant waves polarized respectively in the X and Y directions and fed in phase quadrature then combine together into a circularly polarized global wave emitted by the array of radiating-slot waveguides 5.

By placing the plane antenna 6 thus obtained on an azimuthally rotating platform 7, the pointing of the beam in azimuth is achieved by rotating the platform and the pointing of the beam in elevation is given by the phase law applied to the incoming signals 19. This phase law is obtained by controlling the internal phase shifters 21 and internal amplifiers 22 integrated into each of the waveguides 11 of the lower substrate Sub1. Advantageously, the waveguides 10 with radiating slots operating in a low passband, it is possible to split the transmit and receive functions and to use, as represented in FIG. 2, a system of plane antennas 6, 8 comprising a first array of slot waveguides which is dedicated to transmission and a second array, not represented, of slot waveguides which is dedicated to reception, the two arrays of slot waveguides having identical structure and being mounted on the same azimuthally rotating platform 7. The elevational pointing of each of the transmit and receive antennas of the system of plane antennas mounted on the rotating platform is achieved through amplification and electronic control of the phases of each of the signals circulating in the slot guides forming the radiating arrays of the two antennas.

The height of the antenna without the rotating platform on which it is mounted is a few millimeters. The total height of the antenna with the rotating platform 7 is almost equal to the height of the rotating platform, i.e. of the order of 2 to 3 cm.

The plane antenna thus produced radiates a circularly polarized wave which complies with the height conditions imposed for installation on a transport means and notably on a future high-speed train. Furthermore, the electronic control of the phases and amplitudes of the signals feeding this antenna comprises a number of limited active elements, typically less than 50 elements.

For certain applications, in particular in the aeronautical field, the desired zone of coverage is very extensive and the airplane is liable to operate in zones where the Ka-band satellite is no longer visible but where a Ku-band satellite is accessible. In this case, so that there is no breakage of the satellite connection link, it is advantageous to combine the circular polarization transmit antenna 6 and receive antenna 8 operating in the Ka-band with transmit antennas 30, 31 and receive antennas 32, 33 operating under linear polarization in the Ku-band, as represented in FIG. 3, the Ku-band transmit and receive antennas being produced with the same structure as that described for the Ka-band antennas and being mounted on the same azimuthally rotating platform 7. In this case, according to the standards currently in force, the Ku-band antennas must operate under linear polarization. The linear polarization is obtained by orienting all the radiating slots of all the waveguides of the upper substrate in one and the same direction.

In FIG. 4 is represented a very compact onboard hybrid antenna system operating in the Ka-band (and/or Ku-band) and in the L-band, allowing simultaneous tracking of two satellites. The L-band antenna is installed on the same azimuthally rotating platform 7 as the Ka and/or Ku antenna. The L-band antenna comprises a plurality of radiating crossed dipoles 40 oriented in two orthogonal directions, each radiating dipole comprising two metallic appendages 41, 42 installed on one of the upper M3, intermediate M2 or lower M1 metallic plates of the antenna operating in the Ka-band and/or of the antenna operating in the Ku-band. These appendages 41, 42 are dimensioned so as to operate in the L-band and do not therefore disturb the Ka or Ku antennas on which they are installed. The crossed dipoles are controlled individually in phase by a phase shifter (not represented), and radiate according to their own specific phase law by following the azimuthal orientation of the platform 7 and imposed by the satellite pointed by the Ka and/or Ku antenna. The phase law for the dipoles 41, 42 of the L-band antenna is driven electronically so as to continuously point a satellite operating in the L-band. The antenna thus produced is very compact and allows the simultaneous tracking of two satellites operating respectively in the Ka-band and in the L-band or in the Ku-band and in the L-band by virtue of its Ka and L dual-band operation or Ka, Ku and L tri-band operation according to the type of arrays of radiating-slot guides which are installed on the azimuth platform and the linear and/or circular polarization generated by the phase law combined with the orientation of the radiating slots of these arrays.

Although the invention has been described in conjunction with particular embodiments, it is quite obvious that it is in no way limited thereto and that it comprises all the technical equivalents of the means described as well as their combinations if the latter enter within the scope of the invention.

The invention claimed is:

1. An onboard directional plane antenna comprising:
   at least one array of radiating-slot waveguides comprising an alternating succession of three superposed metallic plates, respectively lower, intermediate and upper plates and two dielectric substrates, respectively lower and upper substrates, inserted between two consecutive metallic plates,
   the two lower and upper substrates each comprising at least four adjacent waveguides, the waveguides of the lower substrate and of the upper substrate being identical in number, corresponding pairwise and communicating with one another pairwise by way of coupling slots passing through the intermediate metallic plate,
   each waveguide of the upper substrate further comprising a plurality of radiating slots passing through the upper metallic plate, all the radiating slots of one and the same waveguide being parallel to one another and oriented in one and the same direction, the radiating slots of two adjacent waveguides being disposed in chevrons,
   each waveguide of the lower substrate comprising an individual internal feed circuit comprising an internal individual electronic circuit for phase shifting and amplification, and
   an external phase shifting electronic circuit intended to establish a circular polarization of a wave emitted by the array of radiating-slot waveguides, the external phase shifting electronic circuit comprising a first external phase shifter having a phase value equal to 180° and intended to feed two waveguides in phase opposition, the other two waveguides being fed in phase, and a second external phase shifter having a phase value equal to 90° and intended to establish a phase quadrature between the two waveguides fed in phase and the two waveguides fed in phase opposition.

2. The plane antenna as claimed in claim 1, wherein each chevron forms an angle equal to 90°.

3. The plane antenna as claimed in claim 1, wherein the array of radiating-slot waveguides is mounted on an azimuthally rotating platform.

4. The plane antenna as claimed in claim 1, further comprising two arrays of radiating-slot waveguides, of identical structure, dedicated respectively to transmission and to reception.

5. The plane antenna as claimed in claim 4, further comprising a plurality of L-band radiating dipoles, the radiating dipoles being installed on one of the metallic plates of the arrays of radiating-slot waveguides mounted on a rotating platform.

6. The plane antenna as claimed in claim 4, further comprising an array of radiating-slot waveguides in which all the radiating slots of all the waveguides are oriented in one and the same direction.

7. A vehicle comprising at least one antenna as claimed in claim 1.

8. A satellite telecommunication system comprising at least one vehicle as claimed in claim 7.

* * * * *